United States Patent
Park et al.

(10) Patent No.: US 6,738,102 B1
(45) Date of Patent: May 18, 2004

(54) LOCAL DIGITAL TELEVISION SIGNAL GENERATOR

(75) Inventors: Jong Seok Park, Kyonggi-do (KR); Jong Sung Choi, Seoul (KR); Ho Jun Nam, Seoul (KR)

(73) Assignee: LG Electronics Inc., Seoul (KR)

( * ) Notice: Subject to any disclaimer, the term of this patent is extended or adjusted under 35 U.S.C. 154(b) by 545 days.

(21) Appl. No.: 09/692,184

(22) Filed: Oct. 20, 2000

(30) Foreign Application Priority Data

Oct. 21, 1999 (KR) .......................................... 1999-45907
Dec. 3, 1999 (KR) .......................................... 1999-54825

(51) Int. Cl.$^7$ ................................................. H04N 5/40
(52) U.S. Cl. ........................ 348/724; 348/552; 375/301
(58) Field of Search ............................... 348/724, 723, 348/552; 375/270, 277, 301, 321; 455/109; H04N 5/40

(56) References Cited

U.S. PATENT DOCUMENTS

| | | | |
|---|---|---|---|
| 5,532,748 A | * 7/1996 | Naimpally | 375/240.25 |
| 5,550,649 A | * 8/1996 | Wong et al. | 358/479 |
| 5,568,205 A | * 10/1996 | Hurwitz | 348/723 |
| 6,081,650 A | * 6/2000 | Lyons et al. | 386/95 |
| 6,515,712 B1 | * 2/2003 | Jeong | 348/608 |

* cited by examiner

*Primary Examiner*—Michael H. Lee
(74) *Attorney, Agent, or Firm*—Birch, Stewart, Kolasch & Birch, LLP

(57) ABSTRACT

A local digital TV signal generator is disclosed, which generates an ATSC RF signal that can be received by a digital TV. Synchronization between a memory device and a VSB remodulator is performed through a controller, and data conversion adapted to the VSB modulator is performed so that streams of ATSC standards are read out from MPEG streams stored in the memory device, thereby outputting an RF signal. Accordingly, the local digital TV signal generator has the low cost and a small volume to facilitate movement as compared with the related art. Since the local digital TV signal generator is mounted inside or outside the PC and implemented using an operating system (O/S) for PC, it is simple and easy in installation and use. Furthermore, since the streams stored in the memory device can be reduced without an external device, it is useful in view of aspects such as mobility, economical efficiency, and maintenance. Moreover, since the local digital TV signal generator can receive and store a digital TV signal which is currently broadcasting, various sources can be provided without a separate device. Also, the local digital TV signal generator may be acted as a digital VCR for home use depending on purpose of use, and may be acted as a digital DVD player if a title of a movie, for example, is provided from a DVD to adapt to the ATSC transport standards.

36 Claims, 8 Drawing Sheets

LOCAL DIGITAL TELEVISION SIGNAL GENERATOR

BACKGROUND OF THE INVENTION

1. Field of the Invention

The present invention relates to a digital TV based on advanced television systems committee (ATSC) standards, and more particularly to a local digital TV signal generator which generates an ATSC radio frequency(RF) signal capable of being received by the digital TV.

2. Discussion of Related Art

In a TV transmitting mode, national television standards committee (NTSC) mode has been adapted for several tens of years. With the introduction of a digital TV recently, the NTSC mode and the digital TV will coexist for several years in the future. There are north American standards and European standards in the digital TV. The north American standards are adapted to the ATSC standards.

In Korea, the ATSC standards have been adapted, and development of appliances related to the digital TV adapted to the ATSC standards is in progress. Therefore, manufacturers of the appliances related to the digital TV adapted to the ATSC standards are requested to manufacture an ATSC RF signal generator for generating an RF signal of the ATSC standards required for development, test, after service and demonstration of sets.

FIG. 1 shows an example of a related art ATSC RF signal generator. Referring to FIG. 1, an RF signal of the ATSC standards is generated using an MPEG test streamer (MTS), a vestigial side band (VSB) modulator, and an RF up-converter. That is to say, the MTS analyzes data compressed with the MPEG and generates MPEG2 streams. As an example, a first byte of the MPEG2 compressed streams always starts at 0×47, and 188 bytes constitute one packet.

A The VSB modulator performs error correction for the MPEG2 compressed streams, reed-solomon(RS) coding, and DC interpolation, so that a VSB intermediate frequency (IF) signal is generated. That is, when a side band of two side bands is largely offset, the VSB modulator modulates the other side band signal only. The side bands occur up and down based on carriers when the amplitude of the signal is modulated. In case of the ground wave, 8VSB modulation mode is adapted.

The RF up-converter converts the VSB IF signal to a desired RF band signal and then sends the converted signal to a cable or a public wave through an RF cable or antenna.

However, the related art ATSC RF signal generator has problems in that it is expensive and complicate in view of various aspects such as installation and use. That is, the related art ATSC RF signal generator costs several hundred millions won and is too big to carry, thereby further complicating the installation and use.

SUMMARY OF THE INVENTION

Accordingly, an object of the present invention is to solve at least the problems and disadvantages of the related art.

An object of the present invention is to provide a local digital TV signal generator having the low cost and a small size suitable for test or demonstration by generating an RF signal of ATSC standards based on a memory device and a VSB remodulator.

Another object of the present invention is to provide a local digital TV signal generator which stores a VSB signal and converts the VSB signal to an RF signal of ATSC standards if desired.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a local digital TV signal generator according to the present invention includes a data memory device for storing data required for digital broadcasting in a memory device and outputting the data stored in the memory device through an input/output(I/O) card, a VSB modulator for VSB modulating input data to output an RF signal, and a controller for synchronizing a clock between the data memory device and the VSB modulator, converting the data output from the data memory device to conform to data input format of the VSB modulator to be output to the VSB modulator, and generating a required control signal.

The memory device of the data memory device stores MPEG compressed streams.

The data memory device further includes a data outputting unit for reading out MPEG compressed streams stored in the memory device, adding a parity of a predetermined byte and a field synchronization to the MPEG compressed streams, and converting streams of ATSC standards.

The memory device of the data memory device stores streams of ATSC standards in which a parity of a predetermined byte and a field synchronization are added to the MPEG compressed streams.

The clock supplied from the controller to the data memory device is determined by a VSB mode.

The clock supplied from the controller to the data memory device is determined by the number of data bytes converted if a serial conversion of data output in parallel from the data memory device is required.

In another aspect, a local digital TV signal generator according to the present invention includes an ATSC signal outputting unit for reading out MPEG compressed streams from a memory device which stores the MPEG compressed streams if a data request is input, converting the MPEG compressed streams to streams of ATSC standards, and outputting the streams through an I/O card, a VSB remodulator for VSB modulating input data to output an RF signal, and an RF signal generator which includes a controller for synchronizing a clock between the ATSC signal outputting unit and the VSB modulator, converting the data output from the ATSC outputting unit to conform to data input format of the VSB remodulator to be output to the VSB remodulator, and generating a required control signal.

The memory device of the ATSC signal outputting unit is a hard disk, and a buffer for performing double buffering is further provided between the hard disk and the I/O card.

The controller of the RF signal generator converts M byte data (M is 2 or more) to N byte data (N is 1 or more) and outputs the converted data to the VSB remodulator, if the M byte data is output from the ATSC signal outputting unit and N byte data is input to the VSB remodulator.

In still another aspect, a local digital TV signal generator according to the present invention includes a downloading unit for downloading data from an external device which stores digital broadcasting data, a memory device for storing the downloaded data, a VSB modulator for VSB modulating the data stored in the memory device to output an RF signal, and an RF signal generator which includes a controller for controlling reading of the downloaded data and the data stored in the memory device.

The memory device is a nonvolatile memory device which enables reading and writing operations.

The external device is a hard disk mounted in a general PC, and outputs transport streams coded according to ATSC standards.

The external device is a DVD mounted in a general PC.

In further another aspect, a local digital TV signal generator according to the present invention includes a memory device for storing transport streams encoded by MPEG algorithm, a VSB signal processor for VSB modulating the data stored in the memory device to output an RF signal, a VSB modulator for reading out the transport streams stored in the memory device if desired and VSB modulating them to output the RF signal, and a controller for synchronizing a clock between the memory device and the VSB modulator and converting the data output from the memory device to conform to data input format of the VSB modulator to be output to the VSB modulator.

The memory device is a hard disk mounted in a general PC.

The memory device is a DVD mounted in a general PC.

In other aspect, a local digital TV signal generator according to the present invention includes a demodulator for receiving a digital broadcasting signal from a broadcasting station, VSB demodulating the digital broadcasting signal, and outputting the demodulated signal to transport streams, an audio/video signal processor for dividing an audio signal and a video signal from the transport streams output from the demodulator so that the audio signal is audio-decoded using AC-3 algorithm and the video signal is video-decoded using MPEG2 algorithm, a memory device for storing the transport streams output from the demodulator, a VSB modulator for VSB modulating the transport streams stored in the memory device to output an RF signal, and a controller for converting the transport streams output from the demodulator to a memory type to be stored in the memory device, reading out the transport streams stored in the memory device to conform to data input format of the VSB modulator to be output to the VSB modulator.

The other blocks except the memory device are designed in at least one or more PC cards and can be mounted inside a PC.

The other blocks except the memory device are designed in a separate set top box and can be mounted outside a PC.

BRIEF DESCRIPTION OF THE ATTACHED DRAWINGS

The invention will be described in detail with reference to the following drawings in which like reference numerals refer to like elements wherein.

DETAILED DESCRIPTION OF PREFERRED EMBODIMENT

Reference will now be made in detail to the preferred embodiments of the present invention, examples of which are illustrated in the accompanying drawings.

In the present invention, it is intended that an RF signal of ATSC standards capable of being easily used for test or demonstration is generated based on a memory device for storing digital TV data, a VSB remodulator for generating an RF signal, and a controller for synchronizing a clock between the memory device and the VSB remodulator. The present invention will be described with reference to various embodiments such as first to fourth embodiments.

All of devices capable of storing data are available for the memory device. For example, ROM, RAM, flash memory, hard disk (HDD) may be used as the memory device. Since the memory device can be applied in wider and various ranges, it is not limited to the above examples. All of devices designed to output an RF signal of VSB mode defined by the ATSC standards through VSB modulation may be used as the VSB remodulator.

First Embodiment

In the first embodiment of the present invention, for convenience of description, an HDD is used as the memory device. It is assumed that the HDD is mounted in a PC. A main body in which the memory device is mounted may be varied depending on which memory device is used.

Figure 1:
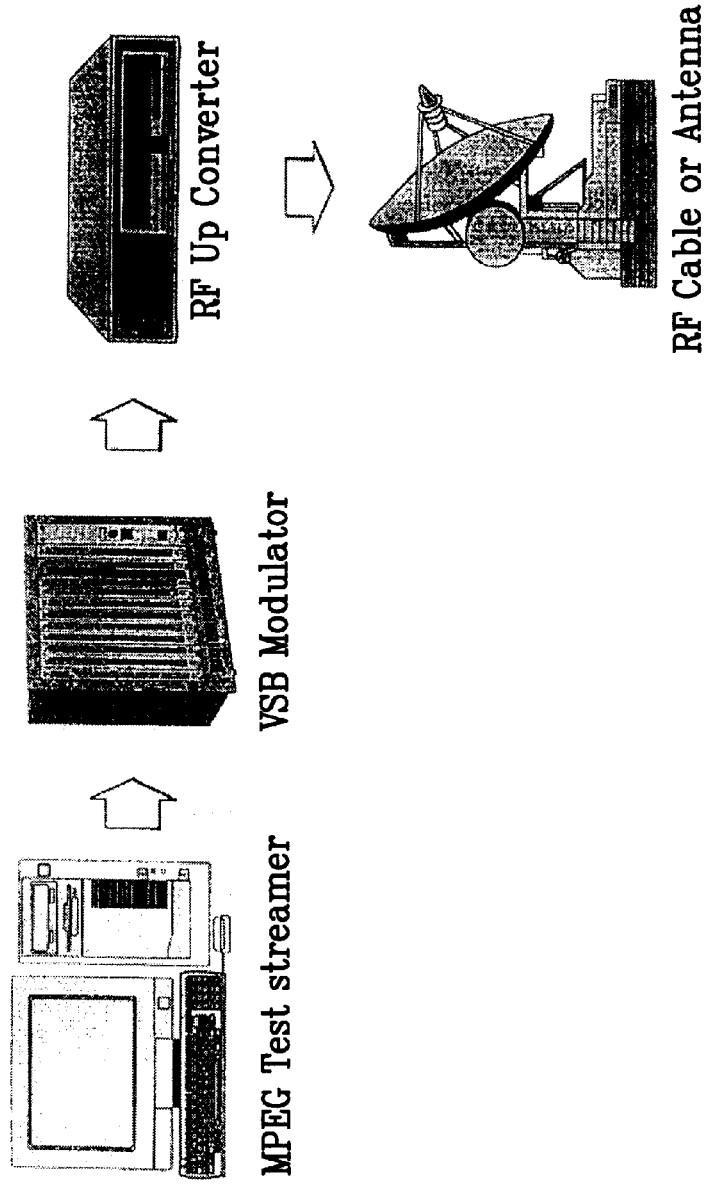
FIG. 1 is a schematic block diagram of a related art ATSC RF signal generator.
Figure 2:
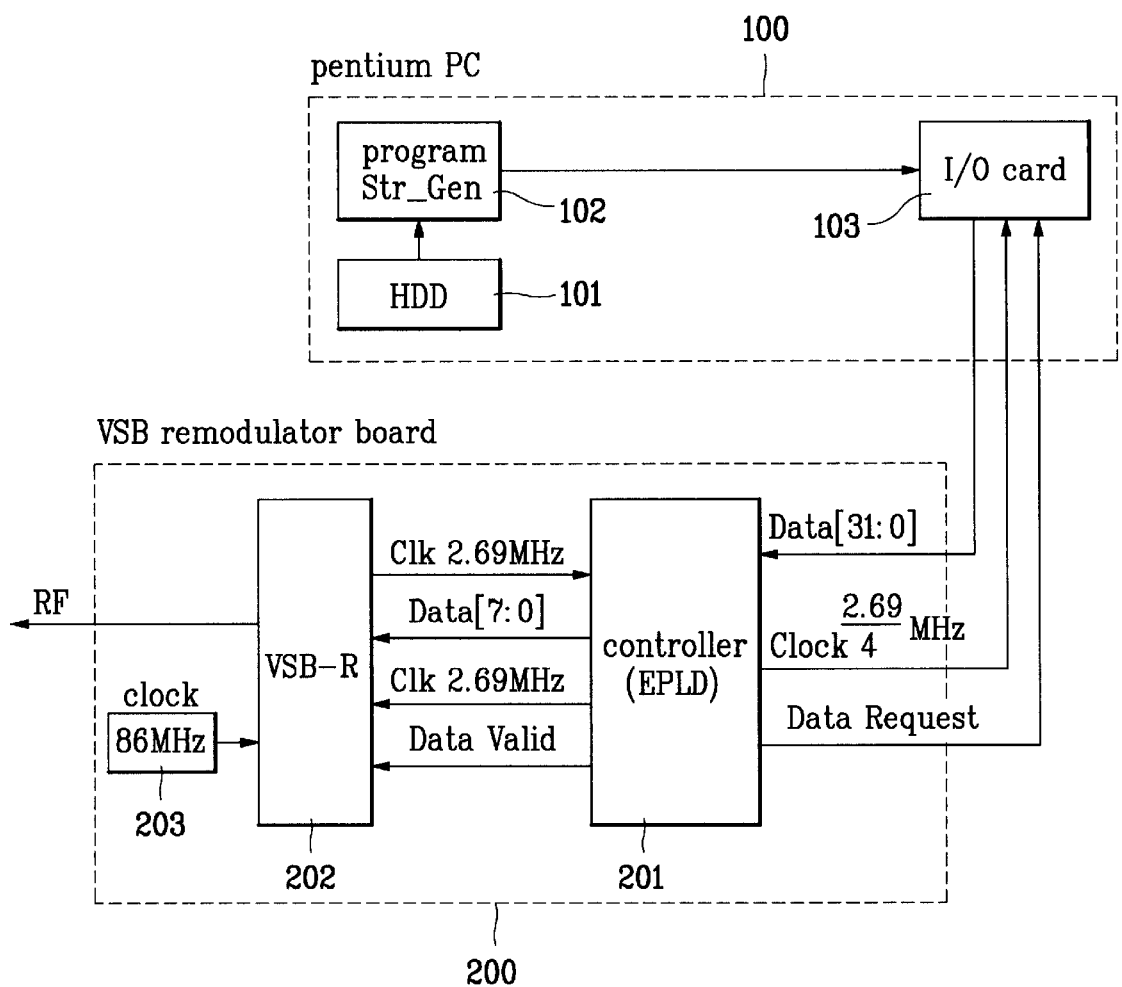
FIG. 2 is a schematic block diagram of a local digital TV signal generator according to the first embodiment of the present invention.

FIG. 2 is a schematic block diagram of a local digital TV signal generator according to the first embodiment of the present invention. Referring to FIG. 2, the local digital TV signal generator includes a general PC 100 in which an HDD is mounted, and a card type RF signal generator 200 inserted into the PC 100. The PC 100 of Pentium level may be used. The PC 100 includes an HDD 101 which stores MPEG-2 compressed streams or streams adapted to the ATSC standards, an ATSC stream converter 102 including a program for converting the MPEG compressed streams stored in the HDD 101 to the streams adapted to the ATSC standards by adding a parity of a predetermined byte to each packet of the MPEG compressed streams, an I/O card 103 for transmitting the ATSC streams to the RF signal generator 200 if there is a data request from the RF signal generator 200. The I/O card 103 is a general I/O card such as a peripheral component interconnect (PCI).

Generally, a path which enables internal devices, such as CPU, memory, disk and extended card, to transmit and receive data and signal is referred to as a bus. The bus includes an internal bus used to transmit data and signal within the CPU, an external bus used to transmit data between the CPU and the memory, and between the memory and the I/O device, and a system bus used to connect the CPU with the memory. Among these buses, the PCI used as the system bus is designed to operate the CPU and the peripheral devices by a separate clock without operating them at the same speed, so that efficiency of the overall system is improved.

The ATSC stream converter 102 may convert the MPEG compressed streams stored in the HDD 101 to the streams adapted to the ATSC standards by adding a parity to each packet of the MPEG compressed streams, and then store them in the HDD 101. Alternatively, the ATSC stream converter 102 may output the MPEG compressed streams to the RF signal generator 200 through the I/O card 103. That is to say, the MPEG compressed streams of 188 byte may be stored in the HDD 101. Otherwise, ATSC streams of 208 byte(=188 data+20 parity) may be stored in the HDD 101.

Furthermore, the ATSC stream converter 102 includes a user interface (UI) function for a user's convenience. That is, functions that can be selected by the user are displayed on a screen by icons, and progress state of the selected function can be displayed on the screen.

The RF signal generator 200 includes a controller 201, a VSB remodulator 201, and a clock generator 203. The controller 201 synchronizes a clock between the I/O card 103 and the VSB remodulator 202, converts data input through the I/O card 103 to conform to data input format of the VSB remodulator, and generates required various control signals. The VSB remodulator 202 VSB modulates the data input through the controller 201 to output an RF signal. The clock generator 203 provides a clock to the VSB remodulator 202.

The controller 201 requests data of the I/O card and provides a clock to the I/O card 103. The I/O card 103 synchronizes required data with input clock if there is a data request, and outputs the synchronized data to the RF signal generator 200.

At this time, the clock provided to the I/O card 103 may be varied depending on the VSB mode, and may also be varied depending on data reading speed of the I/O card 103 and the number of parallel bytes of input data to be serially converted by the controller 201.

For example, if the VSB mode is 4(or 8T)VSB, the I/O card 103 can read out data for each unit of 32 bits, i.e., 4 byte, and parallel data input from the controller 201 for each unit of 4 byte should be converted to serial data of 1 byte, the controller 201 provides a clock 2.69/4 MHz obtained by dividing 2.69 MHz by 4, as defined by the standard of 4(or 8T)VSB, to the I/O card 103. If the I/O card 103 outputs data for each unit of 16 bits, the controller 201 provides a clock 2.69 MHz/2 to the I/O card 103. If the I/O card 103 outputs data for each unit of 8 bits, the controller 201 provides a clock which is not divided, to the I/O card 103.

At this time, if the PCI card is used as the I/O card 103 and the data are read out for each unit of 32 bits, the general PC can be used because any large load is not applied to the PC. However, if the data are read out for each unit of 16 bits or 8 bits, the CPU of high speed is required. This causes large load to be applied to the CPU. If the data are read out for each unit of 64 bits, the cost of the CPU becomes high. Accordingly, in the present invention, it is assumed that the I/O card 103 has four ports(for example, A, B, C and D) and each port reads out data for each unit of 8 bits.

Furthermore, the controller 201 converts the data output from the I/O card 103 to conform to input format of the VSB remodulator 202. As an example, it is assumed that the VSB remodulator 202 is designed to process data for each unit of 8 bits. This may be varied depending on designers.

Therefore, if the I/O card 103 outputs data in parallel for each unit of 4 byte(i.e., 32 bits), the controller 201 converts the data for each unit of 1 byte(i.e., 8 bits) and outputs the converted data to the VSB remodulator 202. If the I/O card 103 outputs data in parallel for each unit of 8 bits, the controller 201 outputs the data to the VSB remodulator without data conversion. That is to say, the controller 201 serves to convert the data output in parallel from the I/O card 103 to serial data if a data format between the I/O card 103 and the VSB remodulator 202 is not proper.

At this time, the controller 201 has an electrically programmable logic device (EPLD) for the purpose of the case that the data format of the I/O card 103 may not be designed to be recognized by the VSB remodulator 202.

The controller 201 generates a data valid signal to allow the VSB remodulator 202 to recognize pure data, and outputs the data valid signal to the VSB remodulator 202 together with the data input through the I/O card 103.

Meanwhile, in case that the HDD 101 is used as a memory device as shown in FIG. 2, it is difficult to continuously read out data at the same speed, thereby causing unstable long play. For a stable long play, a buffer may be provided between the HDD 101 and the I/O card 103. The buffer may perform double buffering. That is, two buffers (or one buffer may be divided into two areas) are alternately used in such a manner that one buffer performs writing operation and the other buffer performs reading operation and then vice versa.

As described above, the RF signal generator 200 outputs data request and interface reference clock (IRC) to the I/O card 103. The I/O card 103 reads out data from the 101 in accordance with synchronization of the IRF and the data request, and sends the data to the RF signal generator 200. As an example, the I/O card (for example, PCI card) can support a handshaking mode and at this time receives an external clock PCLK1 (IRC 2.69/4 MHz from the RF signal generator 200).

The data output from the I/O card 103 may be MPEG compressed streams, or ATSC streams in which parity and field synchronization are added to the MPEG compressed streams.

If the MPEG compressed streams are output through the I/O card 103, the controller 201 should convert the MPEG compressed streams to the ATSC streams. In this case, there is a drawback that clock synchronization is difficult. Thus, PLL may be required for clock synchronization.

Accordingly, in the embodiment of the present invention, it is assumed that the MPEG compressed streams are converted to the ATSC streams through the ATSC stream converter 102 and then input to the controller 201.

Figure 3:
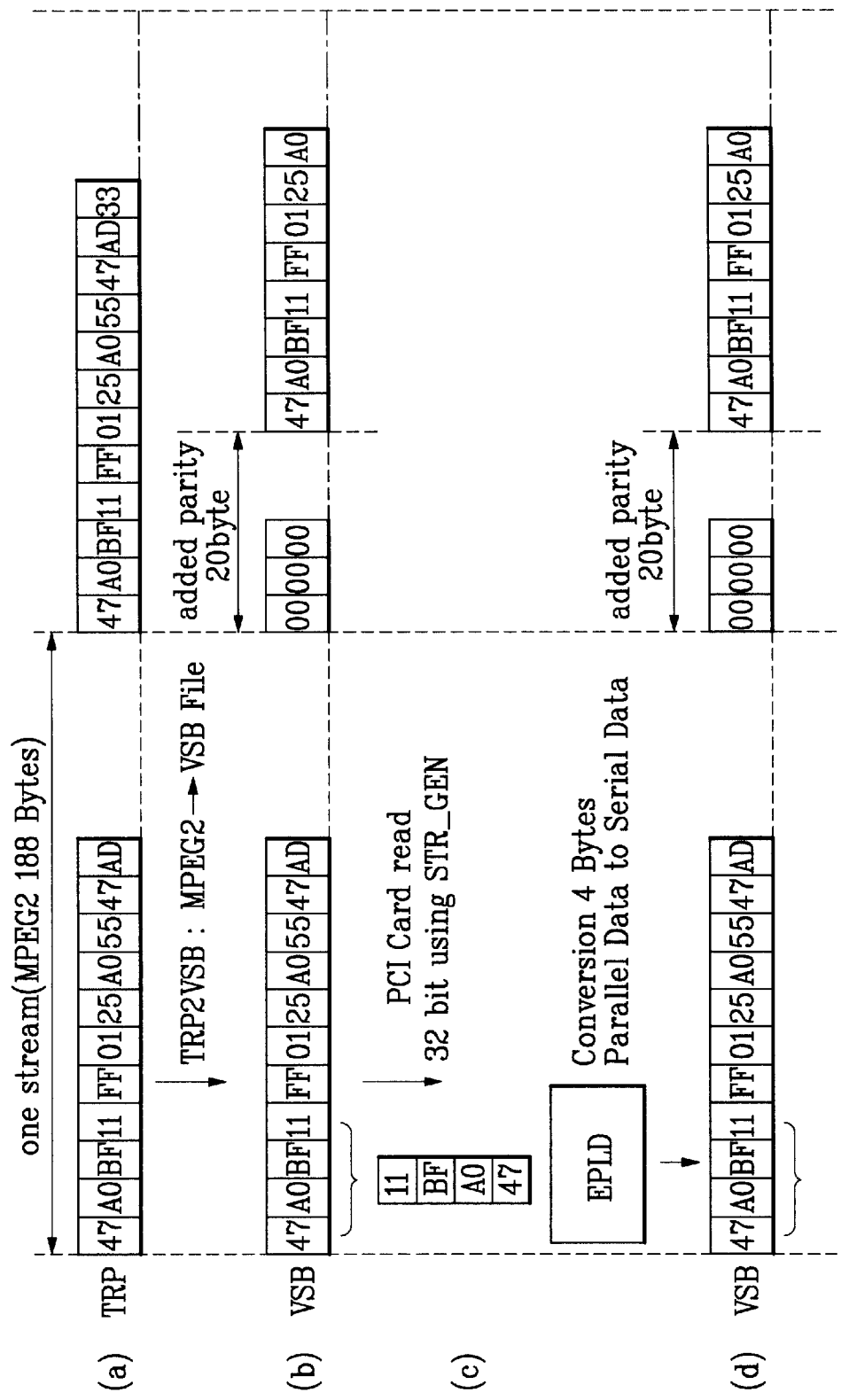
FIGS. 3a to 3d show steps of converting and restoring MPEG compressed streams of FIG. 2 to streams of ATSC standards.

FIG. 3 shows steps of converting and restoring the existing MPEG compressed streams to conform to ATSC standard format, i.e., the format of the VSB remodulator. Referring to FIG. 3, it is assumed that the MPEG compressed streams are stored in the 101, and 4(8T) VSB mode is shown as an example.

In FIG. 3a, TRP is MPEG transport streams, i.e., the MPEG compressed streams stored in the 101, of which first byte always starts at 0×47 and 188 byte constitutes one packet. That is to say, the MPEG compressed streams include packets having lengths of 188 byte, of which first byte is a synchronization byte having the same value 0×47 for all the packets.

The ATSC stream converter 102 generates streams adapted to the ATSC standards by filling parity, 20 byte (for example, 0) in each next period of 188 periods of the MPEG compressed streams having a structure of 188+188+188, as shown in FIG. 3b. In the present invention, data, 188 byte+parity 20 byte are referred to as one segment. A field synchronization exists per 313 period of the data segment, and 208 byte is used as the field synchronization.

The above examples are suggested as an example of 4(8T) VSB mode. In the other VSB mode, ATSC streams should be generated depending on VSB mode of 2, 4, 8, 8T and 16 of the ATSC standards because the field synchronization and the data segment period may be varied respectively.

As described above, when the ATSC stream converter 202 generates the ATSC streams, the I/O card 103 reads out the ATSC streams for each unit of 32 bits as shown in FIG. 3c to output the ATSC streams to the RF signal generator 200 in parallel. As an example, the I/O card 103 reads out the data at the same time using four ports and outputs the read data in parallel for each unit of 32 bits.

The controller 201 of the RF signal generator 200 converts the data input for each unit of 32 bits to 8-bit data format(first byte is 0×47) that can be recognized by the VSB remodulator 202, and outputs the converted data to the VSB remodulator 202.

Figure 4:
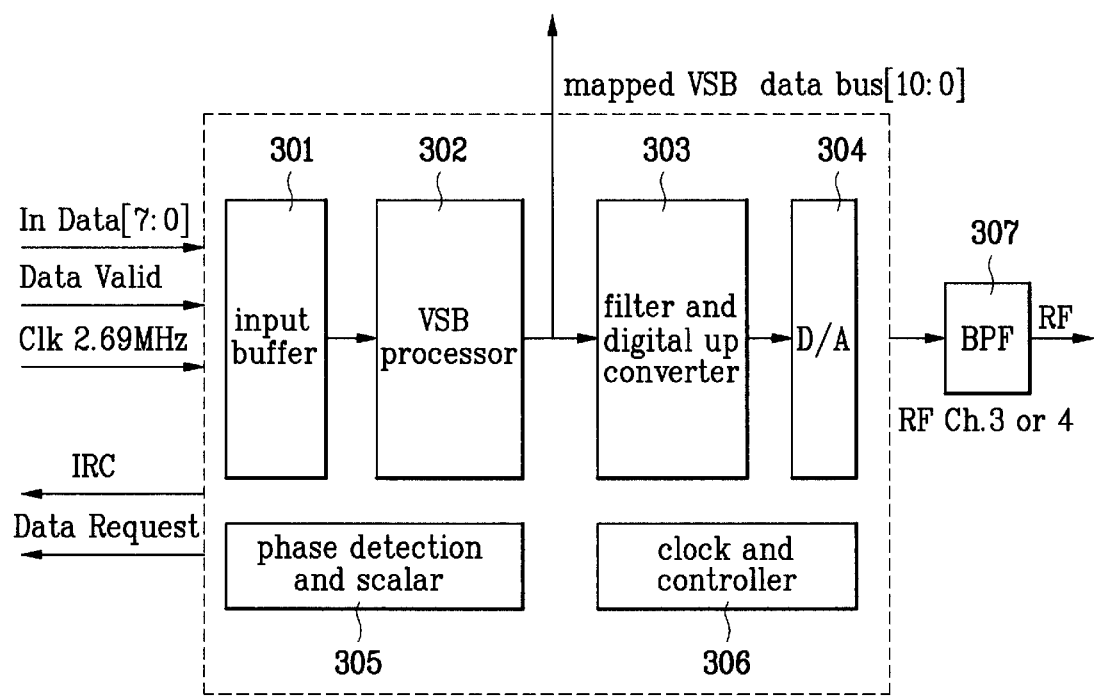
FIG. 4 shows an example of an internal structure of a VSB remodulator of FIG. 2.

FIG. 4 shows an internal structure of the VSB remodulator 202. Referring to FIG. 4, the VSB remodulator 202 outputs the data request and IRC to the I/O card 103 through the controller 201, and receives data In_Data [7:0] which will be converted to an RF signal, data valid Data_valid, and clock of 2.69 MHz. At this time, the VSB remodulator 202 is not operating if the data In_$_{Data}$[7:0], the data valid Data_valid, and the clock 2.69 MHz are not synchronized with a master clock of 86 MHz. Accordingly, for synchronization, a PLL circuit may be externally provided if desired.

Figure 5:
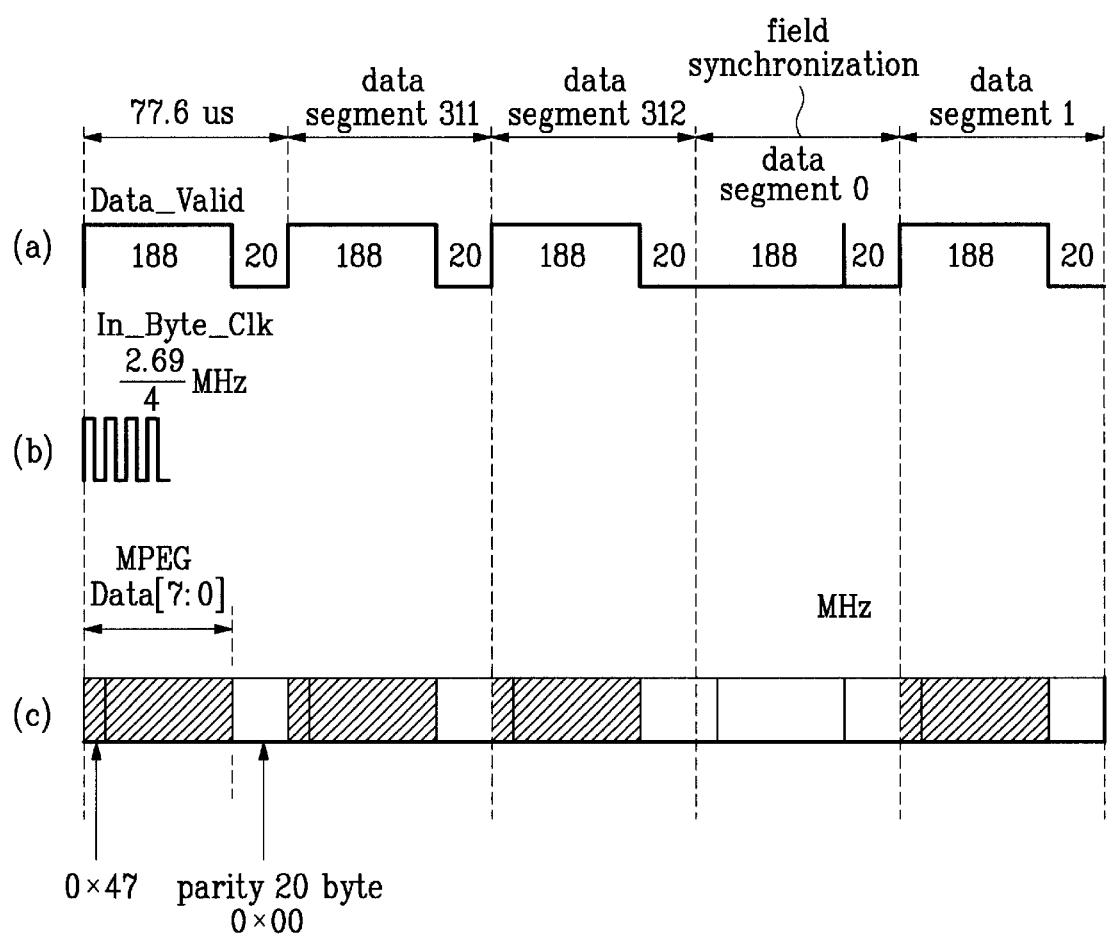
FIGS. 5a to 5c show structures of streams input to the VSB remodulator.

FIG. 5 shows three signals input to the inside of a chip of the VSB remodulator 202 in which the first byte of one packet should be 0×47. As shown in FIG. 5b, data reading should be performed in a polling of In_Byte_Clk(for example, 2.69 MHz). Also, as shown in FIG. 5a, the data valid signal should be high in 188 period for data synchronization and should be low in 20 byte parity period and a field synchronization period repeated per 313 data segment. In other words, the data valid signal serves to classify pure data only in one packet except additional data such as a parity signal. The data valid signal can be generated by counting from a synchronization byte starting at 0×47 to 188. Since a parity code added to the MPEG transport streams is required in ECC decoding only, the data valid signal classifies pure data. This is applied to the field synchronization signal in the same manner.

At this time, the ATSC streams output from the general PCI I/O card 103 are stored in an input buffer 301. The ATSC streams are then synchronized with the clock and are output to a VSB processor 302. The VSB processor 302 VSB modulates the ATSC streams to generate a VSB IF signal. A filter and digital up converter 303 converts the VSB IF signal to an RF signal of 4(8T) VSB mode defined in ATSC standards A/53 Annex D. It is assumed that the RF signal is converted to an analog signal by a D/A converter 304, filtered by a band pass filter (BPF) 307, and output to RF channels Nos. 3 and 4. At this time, the BPF 307 has a band width of 12 MHz to protect signals of the RF channels Nos. 3 and 4 and also has a central frequency of 65.97 MHz. The RF channels Nos. may be varied depending on the designers. For this reason, the band width filtered by the BPF 307 and the central frequency may be varied.

Figure 6:
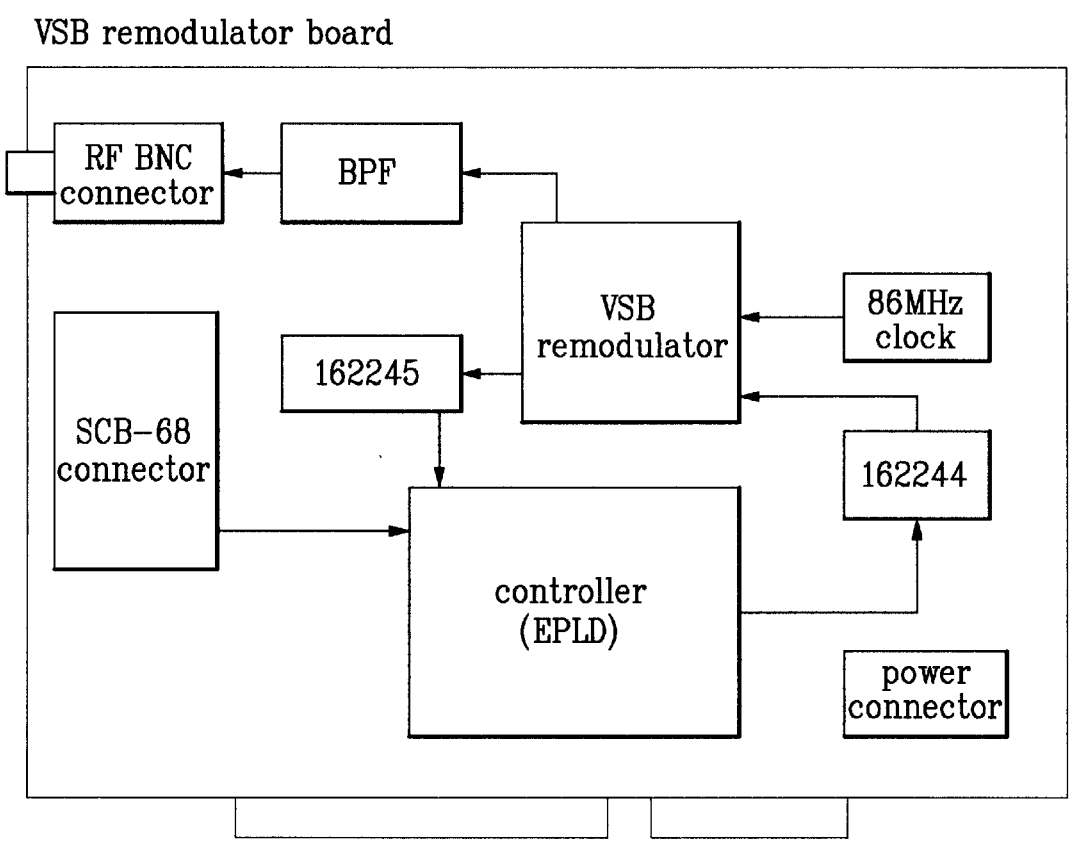
FIG. 6 shows an actually embodied example of the VSB remodulator.

FIG. 6 shows an actually embodied example of the VSB remodulator 202. Referring to FIG. 6, the VSB remodulator 202 sends the data request and the IRC to the I/O card 103 through SCB-68 connector and receives a 32-bit signal from the I/O card 103. For example, ALTERA 7128 serves to convert 4 byte(i.e., 32 bits) parallel data to 1 byte(i.e., 8 bits) serial data. 162244, 164245 is a general buffer and serves to convert a signal of 5V of the controller to 3.3V or a signal of 3.3V of the VSB remodulator 202 to 5V. The VSB remodulator 202 converts the ATSC streams to which the parity is added per 188 byte to the RF signal through encoding steps such as VSB modulation, RF up conversion and D/A conversion. The clock of 86 MHz is a master clock, the BPF protects the signals of the RF channels Nos. 3 and 4, and BNC is a generally used connector.

As described above, in the present invention, the RF signal and the transport streams adapted to the ATSC standards can be obtained at the lower cost by manufacturers of a digital TV receiver related to the ATSC standards. The digital TV receiver can be developed at a general PC level. That is, the streams can be generated more easily using a graphic user interface (GUI) of window 95/98/NT. Accordingly, the present invention can be applied to all the parts which require the VSB RF signal of the ATSC standards.

In addition, in the present invention, the RF signal of 2,4,8,8T,16 VSB mode adapted to the ATSC standards can be obtained by only developing format change software of the streams.

In the aforementioned first embodiment of the present invention, the RF signal of the ATSC standards is easily generated at the low cost using a general PC. Particularly, the present invention has a simple structure in which the I/O card is a PCI card and overall transmitting equipments are mounted in the PC. That is, the cost of the existing ATSC RF signal generator was several hundred millions won. However, in the present invention, since the RF signal generator is additionally mounted in the PC, the cost is several millions won.

At this time, the RF signal generator may be designed as either one board incorporating the I/O card or a separate board. In case that the RF signal generator is designed as one board, the volume of the PC can be reduced. In case that the RF signal generator is designed as a separate board, the ATSC RF signal can easily be generated by externally mounting the separate board in a notebook computer not the general PC.

Second Embodiment

In the second embodiment of the present invention, a memory is provided inside the RF signal generator. The memory stores transport streams coded according to the ATSC standards and generates the RF signal of the ATSC standards if desired.

Figure 7:
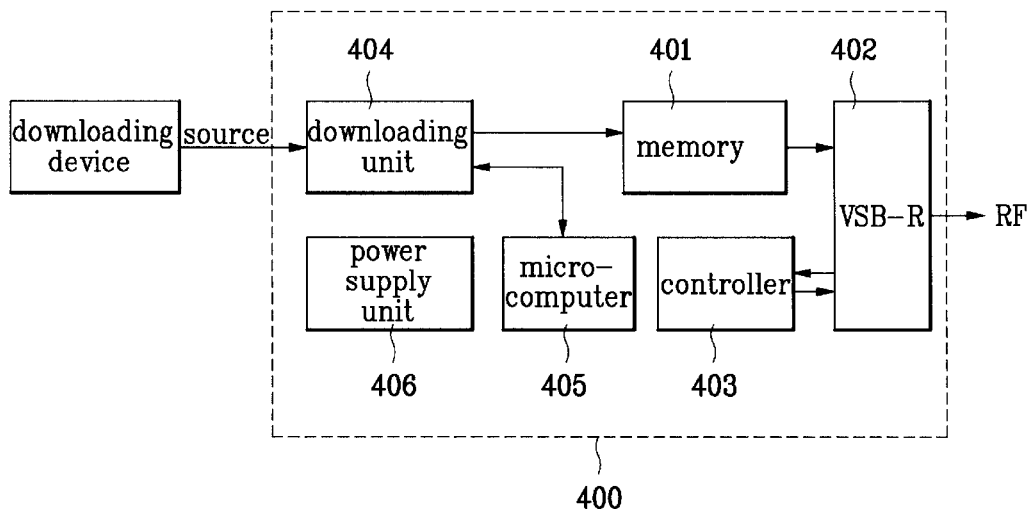
FIG. 7 is a schematic block diagram of a local digital TV signal generator according to the second embodiment of the present invention.

FIG. 7 is a schematic block diagram of a local digital TV signal generator according to the second embodiment of the present invention. A reference numeral 400 denotes an RF signal generator.

The RF signal generator 400 includes a memory 401 for storing transport streams, a VSB modulator 402 for converting the transport streams stored in the memory 401 to the RF signal of the ATSC standards, a controller 403 for controlling reading operation of the data stored in the memory 401 and VSB modulation of the VSB remodulator 402, a downloading unit 404 for downloading the transport streams from a downloading device in case that a flash memory is used as the memory 401, and storing the downloaded transport streams in the memory 401, and a microcomputer 405 for controlling the downloaded data of the downloading unit 404.

A reference numeral 406 which is not described denotes a power supply unit for supplying power to each block. All of devices capable of storing the MPEG streams may be used as the downloading device. As an example, a general PC may be used as the downloading device.

In FIG. 7, the memory 401 of the RF signal generator 400 stores the transport streams coded according to the ATSC standards. At this time, the memory 401 may be a nonvolatile memory such as a ROM which enables reading operation only, or a nonvolatile memory such as a flash memory which enables reading and writing operations. In the same manner as the memory of the first embodiment, the memory 401 can be applied in wider and various ranges. Accordingly, the memory is not limited to the above examples.

If the flash memory is used as the memory 401, it can download other bit streams through a download port of the downloading unit 404 if desired. In such case, since the user can download desired bit streams to generate a VSB modulated RF signal if desired, the memory 401 can be used more effectively as compared with the case that the ROM is used as the memory 401.

At this time, the size of the memory 401 may be varied depending on how many transport streams are stored in the memory 401. Since data of about 2.69 Mbyte per second in the ATSC standards is transmitted, the size of about 27 Mbyte is required to store transport streams for 10 seconds, for example.

Meanwhile, if the flash memory is used as the memory 401, the download port of the downloading unit 404 is used to externally download transport streams and store the downloaded transport streams in the flash memory. For example, to exchange the streams stored in the flash memory, desired streams can be stored in the flash memory by downloading them from the downloading device such as a PC using the download port.

The microcomputer 405 controls the system if new transport streams are downloaded from the external downloading device. That is, the microcomputer 405 controls the system so that the new transport streams are stored in the flash memory if the new transport streams are downloaded from the external downloading device such as PC.

As described above, the transport streams stored in the memory 401 are converted to the RF signal of the ATSC standards through the VSB remodulator 402 if desired, for example, in case of test, development, after service and demonstration.

In other words, the VSB remodulator 402 performs channel coding of the transport streams read out from the memory 401, such as randomizing, R-S coding, interleaving, trellis coding, synchronization interpolation and pilot interpolation, to conform to the ATSC standards. The VSB remodulator 402 also performs RF modulation to transmit the channel coded data to a channel. At this time, all of devices designed to output the RF signal of VSB mode defined by the ATSC standards through VSB modulation may be used as the VSB remodulator 402. One chip type may be used as the VSB remodulator 402. FIG. 4 shows an example of the VSB remodulator 402.

The controller 403 controls the steps of reading out the data stored in the memory 401 and transmitting the data to the VSB remodulator 402. That is, the controller 403 generates memory addresses for reading out the data and various control signals. At this time, the controller 403 may include other discrete devices or FPGA chip such as altera.

In this case, the RF signal generator 400 may be designed as a PC card type to be mounted in a PC in the same manner as the first embodiment. Alternatively, the RF signal generator 400 may be designed as a separate external device type box. In case that the RF signal generator is designed as a separate external device type box, the ATSC RF signal generator can be provided in a notebook computer.

As described above, in the second embodiment of the present invention, the ATSC RF signal generator can be used effectively at the low cost as a signal generating source for development/demonstration/service/production of the product related to a digital TV.

Third Embodiment

In the third embodiment of the present invention, it is intended that a broadcasting signal from the broadcasting station, for example, a VSB signal according to the north American and domestic digital TV transmitting mode is received and stored, and then the VSB signal is reproduced if desired.

Figure 8:
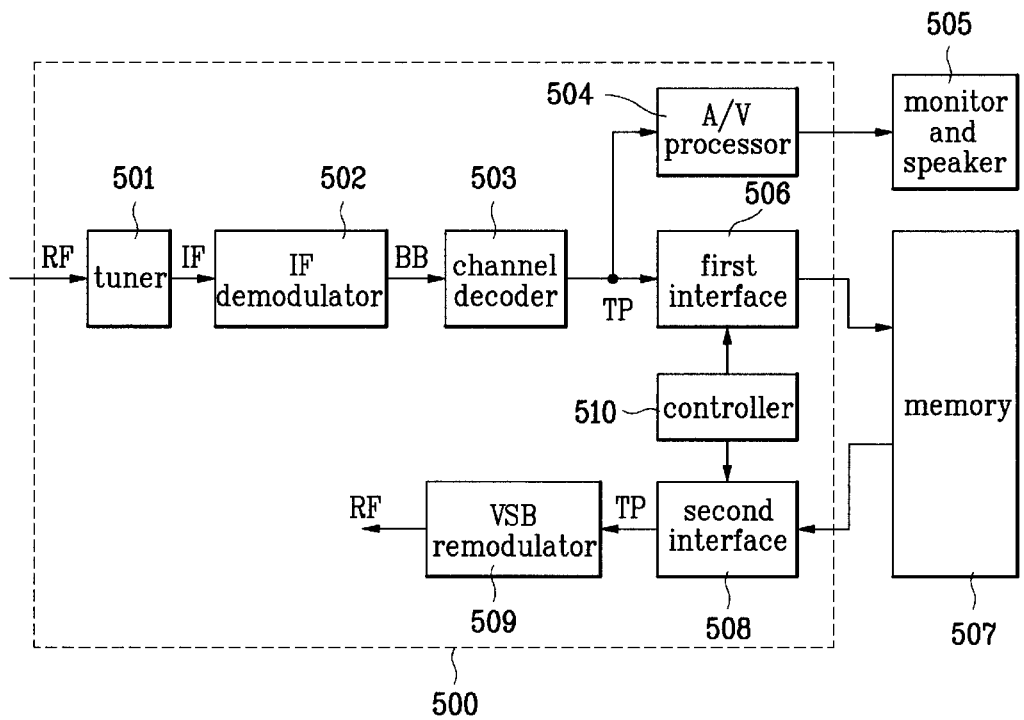
FIG. 8 is a schematic block diagram of a local digital TV signal generator according to the third embodiment of the present invention.

FIG. 8 is a schematic block diagram of a local digital TV signal generator according to the third embodiment of the present invention. Referring to FIG. 8, a reference numeral 500 denotes a VSB signal processor and a reference numeral 507 denotes a memory which is mounted outside the VSB signal processor 500.

The VSB signal processor 500 includes a tuner 501 for tuning an RF signal of a corresponding channel from an antenna and converting the RF signal to an intermediate frequency (IF) signal, an IF demodulator 502 for down converting the IF signal output from the tuner 501 to output a base band signal, a channel decoder 503 for performing channel decoding of the base band signal to output transport streams, an audio/video(A/V) processor 504 for dividing an audio signal and a video signal from the transport streams output from the channel decoder 503 so that the audio signal is audio-decoded using AC-3 algorithm and the video signal is video-decoded using MPEG2 algorithm, a first interface 506 for converting the transport streams output from the channel decoder 503 to a memory type to be stored in the memory 507, a second interface 508 for reading out the transport streams stored in the memory 507 to output the RF signal of the ATSC standards, a VSB remodulator 509 for converting the transport streams input through the second interface 508 to the RF signal of the ATSC standards, and a controller 510 for controlling the first and second interfaces 506 and 508 and the memory 507 to store the data of the memory 507 and VSB modulate the stored data.

The first and second interfaces 506 and 508 may be a general I/O card such as a PCI card.

In FIG. 8, if the VSB modulated RF signal is received through the antenna, the tuner 501 selects only the RF signal of a desired channel and converts the selected signal to the IF signal, so as to be output to the IF demodulator 502. The IF demodulator 502 performs down conversion of the IF signal output from the tuner 501 to a base band signal and outputs the base band signal to the channel decoder 503.

The channel decoder 503 compensates for channel distortion occurring during data transmission through a transport channel and restores the data to original transport streams. To this end, the channel decoder 503 performs derandomizing, R-S decoding, Trellis decoding, synchronization recovery and deinterleaving of the base band signal so that the data broken by noise on the channel can be restored. In other words, if the digital TV signal is transmitted through the channel, original data may be broken due to noise on the channel. Then, the channel decoder 503 restores the broken data to original data. In this case, the channel decoder 503 may be called a VSB demodulator. Meanwhile, one chip may constitute the IF demodulator 502 and the channel decoder 503 depending on chip makers.

The A/V processor 504 divides an audio signal and a video signal from the transport streams decoded by the channel decoder 503 and performs Dolby AC-3 audio decoding and MPEG-2 video decoding for each signal. In other words, the divided audio signal is decoded using Dolby AC-3 algorithm and then output to a speaker of a display unit 505.

Here, the AC-3 algorithm is adopted by audio standards of a digital ground wave TV, and means a third type of an audio coding method newly developed by Dolby research laboratory in the U. S. A., which is famous for noise removing technology of audio.

The divided video signal is decoded using MPEG-2 algorithm and then output to a monitor of the display unit 505. Here, the MPEG-2 algorithm means that overhead such as various header data and start code is removed from the video signal, variable length decoding (VLD) of pure data is performed, and a pixel value of an original screen is restored by inverse quantization, inverse discrete cosine transform (IDCT), and motion compensation step based on a motion vector.

Meanwhile, the transport streams channel decoded by the channel decoder 503 are stored in the memory 507 through the first interface 506. That is, the first interface 506 converts the transport streams output from the channel decoder 503 to a memory type to be stored in the memory 507. The second interface 508 reads out the transport streams stored in the memory 507 if desired and outputs the transport streams to the VSB remodulator 509. If the channel decoded transport streams, i.e, the MPEG compressed streams are stored in the memory 507, the second interface 508 converts the MPEG compressed streams to the ATSC streams and outputs the converted streams to the VSB remodulator 509. For example, a parity of a predetermined byte is added to each packet of the MPEG compressed streams read out from the memory 507 so that the MPEG compressed streams are converted to the streams adapted to the ATSC standards.

At this time, if the general PCI card may be used as the second interface 508 and the data are read out for each unit of 32 bits, the second interface converts the data for each unit of 32 bits to 1 byte(8 bits) and outputs the converted data to the VSB remodulator 509. If the data stored in the memory 507 are read out for each unit of 8 bits, the data are output to the VSB remodulator 509 without data conversion.

Here, all of devices capable of storing data may be used as the memory 508. If the general PC is used as the display unit 505 and the memory 507, the HDD may be used as the memory 507. Here, since the memory 507 can be applied in wider and various ranges, it is not limited to the above examples.

As described above, the transport streams stored in the memory 507 are converted to the RF signal of the ATSC standards through the VSB remodulator 509 if desired, for example, in case of test, development, after service, and demonstration.

In other words, the VSB remodulator 509 performs channel coding of the transport streams read out from the memory 507, such as randomizing, R-S coding, interleaving, Trellis coding, synchronization interpolation and pilot interpolation according to the ATSC standards. The VSB remodulator 509 also performs RF modulation to transmit the channel coded data to a channel. At this time, all of devices designed to output the RF signal of the VSB mode defined by the ATSC standards through VSB modulation may be used as the VSB remodulator 509. One chip type may be used as the VSB remodulator 509.

The controller 510 controls the first interface 506 to store the transport streams in the memory 507, and controls the second interface 508 to read out the transport streams stored in the memory 507. Also, the controller 510 generates memory addresses for reading out the data and outputs the memory addresses to the memory 507.

At this time, the VSB signal processor 500 may be designed in one or more PC card types to be mounted in a PC such as a desk top PC. Alternatively, the VSB signal processor 500 may be designed as a separate set top box. In this case, the VSB signal processor 500 may be used in a PC such as a notebook computer.

If the VSB signal processor 500 is embodied as a PC card type and mounted in the PC, the VSB signal processor 500 is driven by the power of the PC. However, if the VSB signal processor 500 is embodied as an external device type, a separate power supply should be provided in the VSB signal processor 500.

Here, if the VSB signal processor 500 is embodied as an external device type, the VSB signal processor 500 may be used as a personal signal transmitting/receiving equipment for demonstration, service, or development of a digital TV due to its easy movement.

Furthermore, in the third embodiment of the present invention, the RF signal instead of the transport streams may be stored in the memory 507. In this case, a separate tuner is required.

As described above, in the third embodiment of the present invention, a broadcasting signal received in a current digital TV broadcasting area can be stored in the HDD inside the PC, and the stored data can be reproduced if desired. Particularly, since the broadcasting signal is used, it is not limited by a source. That is, a separate source is not necessary.

Accordingly, in the related art, although the high cost has been caused to obtain bit streams required for development/demonstration/service/production of a digital TV, in the third embodiment of the present invention, various bit streams can be provided at the low cost because the streams of the current broadcasting signal can be reproduced at any time after they are received and stored.

Furthermore, since the capacity of the memory 507 can be extended to the sufficient range, the present invention can be functioned as a digital video cassette recorder (VCR) for home use. In other words, the user can store a desired scene or program in the memory 507 while viewing the digital TV broadcasting, so as to reproduce it at any time.

Furthermore, if the general PC is used as the memory and display unit, a DVD driver is generally mounted in the PC. In this case, the function of the DVD player may also be performed.

Figure 9:
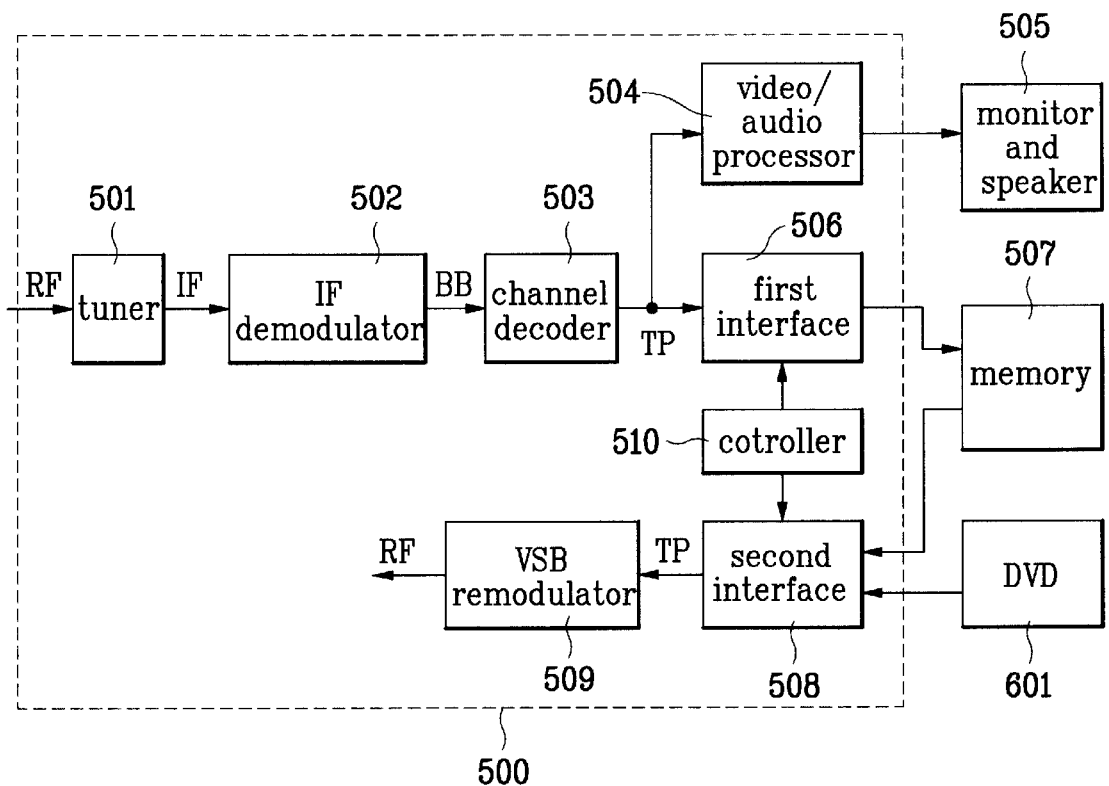
FIG. 9 is a schematic block diagram of a local digital TV signal generator further including a DVD driver in FIG. 8.

FIG. 9 is a schematic block diagram of a local digital TV signal generator further including a DVD driver in FIG. 8.

If a DVD title stored in the DVD is formed according to the ATSC standards, the data can be read out from the DVD

601 and then can be reproduced without separate hardware or software. Namely, if the transport streams stored in the DVD 601 are read out through the second interface 508 and then output to the VSB remodulator 509, the VSB remodulator 509 outputs the RF signal of the ATSC standards through channel coding and RF modulation. Accordingly, the contents stored in the DVD 601 can be viewed at any time through a monitor of a general TV or PC, if desired, by receiving the output of the VSB remodulator 509 through the RF channels (for example, channel numbers 3 and 4).

For example, the DVD title can be provided by MPEG-2 encoding a movie, converting the encoded data to the transport streams and storing the converted data in the DVD 601. The DVD title permits storing and reproduction of the current broadcasting signal, so that the functions of the digital recording/reproducing apparatus can be performed at the low cost.

Fourth Embodiment

Figure 10:
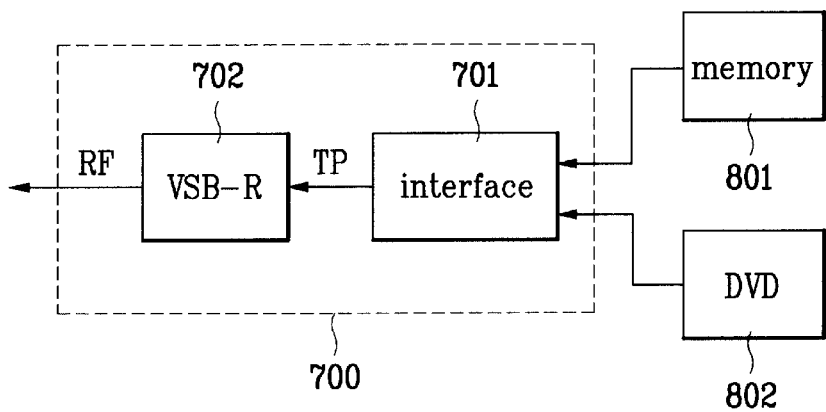
FIG. 10 is a schematic block diagram of a local digital TV signal generator according to the fourth embodiment of the present invention, in case that reproduction of stored data is only required using a notebook PC or a desk top PC.

To reproduce only stored data using a notebook PC or a desk top PC, a local digital TV signal generator according to the fourth embodiment of the present invention will be provided as shown in FIG. 10.

If transport streams stored in a memory 801 such as HDD, or a DVD 802 are output to a VSB remodulator 702 through an interface 701, the VSB remodulator 702 performs channel coding of transport streams read out from the memory 801 or the DVD 802 according to the ATSC standards, and also performs RF modulation to transmit the channel coded data to a channel. The RF signal can be viewed through a TV or a monitor of a PCrby converting the RF signal to an analog signal and then outputting it to particular channel Nos. (for example, RF channels Nos. 3 and 4). At this time, the interface 701 synchronizes a clock between the memory 801 and the VSB remodulator 702 and performs data conversion of the data stored in the memory 801 to conform to input format of the VSB remodulator 702.

As described above, in the fourth embodiment of the present invention, the local digital TV signal generator is designed for reproduction so as to be effectively used at the low cost. Also, since the local digital TV signal generator according to the fourth embodiment is driven in a general PC, it can be used to analyze the ATSC signal based on software which analyzes received data. Moreover, the local digital TV signal generator of the present invention can be used in various fields which adopt the ATSC transmitting mode. Particularly, since the local digital TV signal generator of the fourth embodiment can substitute for the existing expensive equipments used to generate the ATSC signal, it is possible to obtain the ATSC signal of high quality at the low cost.

Meanwhile, although the local digital TV signal generator of the fourth embodiment is based on the ATSC signal (VSB), it may be applied to QAM or QPSK by correcting each sub block to adapt to the QAM or QPSK. That is to say, the local digital TV signal generator of the present invention may be applied to a digital TV of QAM mode or QPSK mode by replacing the VSB remodulator with a QAM remodulator or QPSK remodulator.

Furthermore, the local digital TV signal generator of the present invention can be applied in various fields such as research laboratories, broadcasting stations, homes, manufacturing factories of digital TV, department stores, service centers, appliance agents, exhibitions, various tests, and development of software.

Particularly, the present invention can substitute for a digital video cassette recorder used in the broadcasting station so that all of broadcasting programs can be generated directly in a computer.

As aforementioned, the local digital TV signal generator according to the present invention has the following advantages.

Synchronization between the memory device and the VSB remodulator is performed through the controller, and data conversion adapted to the VSB modulator is performed so that the streams of the ATSC standards are read out from the MPEG streams stored in the memory device, thereby outputting the RF signal. Accordingly, the local digital TV signal generator of the present invention has the low cost and a small volume to facilitate movement as compared with the related art. Since the local digital TV signal generator of the present invention is mounted inside or outside the PC and implemented using an operating system(O/S) for PC, it is simple and easy in installation and use.

Furthermore, since the local digital TV signal generator of the present invention can receive and store the digital TV signal which is currently broadcasting, various sources can be provided without a separate device. Also, the local digital TV signal generator of the present invention may be acted as a digital VCR for home use depending on purpose of use, and may be acted as a digital DVD player if a title of a movie, for example, is provided from the DVD to adapt to the ATSC transport standards.

Particularly, since the local digital TV signal generator of the present invention can be driven in the general PC and can independently reproduce the streams stored in the memory without an external device, it is useful in view of aspects such as mobility, economical efficiency, and maintenance. Also, in the present invention, the user can use its desired stream by downloading it in the memory. Moreover, the local digital TV signal generator of the present invention can extend its purpose of use to analysis of the ATSC signal depending on application of software in the PC.

Finally, the local digital TV signal generator of the present invention can substitute for the ATSC signal generator of a digital TV used in the broadcasting system, in the future, so that all of programs can be generated directly in the computer.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A local digital TV signal generator comprising:
   a data memory device mounted in a PC for storing data required for digital broadcasting in a memory device and outputting the data stored in the memory device through an input/output(I/O) card;
   a VSB modulator for VSB modulating input data to output an RF signal; and
   a controller for synchronizing a clock between the data memory device and the VSB modulator, converting the data output from the data memory device to conform to data input format of the VSB modulator to be output to the VSB modulator, and generating a required control signal said controller and VSB modulator being included in an RF generator card in said PC.

2. The local digital TV signal generator of claim 1, wherein the memory device of the data memory device stores MPEG compressed streams.

3. The local digital TV signal generator of claim 2, wherein the data memory device further includes a data outputting unit for reading out the MPEG compressed streams stored in the memory device, adding a parity of a predetermined byte and a field synchronization to the MPEG compressed streams, and converting them to streams of ATSC standards.

4. The local digital TV signal generator of claim 3, wherein the memory device of the data memory device stores the streams of ATSC standards in which a parity of a predetermined byte and a field synchronization are added to the MPEG compressed streams.

5. The local digital TV signal generator of claim 1, wherein the clock supplied from the controller to the data memory device is determined by a VSB mode.

6. The local digital TV signal generator of claim 1, wherein the clock supplied from the controller to the data memory device is determined by the number of data bytes converted if a serial conversion of data output in parallel from the data memory device is required.

7. A local digital TV signal generator comprising:
 an ATSC signal outputting unit for reading out MPEG compressed streams from a memory device which stores the MPEG compressed streams if a data request is input, converting the MPEG compressed streams to streams of ATSC standards, and outputting the streams through an I/O card;
 a VSB remodulator for sequentially performing VSB modulation, digital up-conversion, digital/analog conversion and conversion to an RF signal; and
 an RF signal generator which includes a controller for synchronizing a clock between the ATSC signal outputting unit and the VSB remodulator, converting the data output from the ATSC outputting unit to conform to data input format of the VSB remodulator to be output to the VSB remodulator, and generating a required control signal.

8. The local digital TV signal generator of claim 7, wherein the ATSC signal outputting unit is a general PC.

9. The local digital TV signal generator of claim 7, wherein the I/O card of the ATSC signal outputting unit is a general PCI card.

10. The local digital TV signal generator of claim 7, wherein the memory device of the ATSC signal outputting unit is a hard disk.

11. The local digital TV signal generator of claim 10, wherein a buffer for performing double buffering is further provided between the hard disk and the I/O card.

12. The local digital TV signal generator of claim 7, wherein the ATSC signal generator displays functions that can be selected by a user on a screen by icons, and recognizes progress state of the selected function.

13. The local digital TV signal generator of claim 7, wherein the controller of the RF signal generator converts M byte data (M is 2 or more) to N byte data (N is 1 or more) and outputs the converted data to the VSB remodulator, if the M byte data is output from the ATSC signal outputting unit and the N byte data is input to the VSB remodulator.

14. The local digital TV signal generator of claim 12, wherein the RF signal generator divides a clock of a predetermined VSB mode into N/M and supplies the clock to the ATSC signal generator.

15. The local digital TV signal generator of claim 7, wherein the VSB remodulator of the RF signal generator outputs the RF signal through a particular channel and further includes a pass band filter to protect a signal of the particular channel.

16. The local digital TV signal generator of claim 7, wherein the RF signal generator is an internal device which is inserted into the ATSC signal generator.

17. The local digital TV signal generator of claim 7, wherein the RF signal generator is an external device which is mounted outside the ATSC signal generator.

18. A local digital TV signal generator comprising:
 a downloading unit for downloading data from an external device which stores digital broadcasting data;
 a microcomputer for controlling said downloading unit;
 a memory device for storing the downloaded data;
 a VSB modulator for VSB modulating the data stored in the memory device to output an RF signal; and
 an RF signal generator which includes a controller for controlling reading of the downloaded data and the data stored in the memory device and for controlling said VSB modulator.

19. The local digital TV signal generator of claim 18, wherein the memory device is a nonvolatile memory device which enables reading and writing operations.

20. The local digital TV signal generator of claim 19, wherein the memory device is a flash memory.

21. The local digital TV signal generator of claim 18, wherein the memory device is a ROM which enables reading only, and does not require downloading in this case.

22. The local digital TV signal generator of claim 18, wherein the external device is a hard disk mounted in a general PC, and outputs transport streams coded according to ATSC standards.

23. The local digital TV signal generator of claim 18, wherein the external device is a DVD mounted in a general PC.

24. The local digital TV signal generator of claim 23, wherein the DVD stores transport streams encoded by MPEG algorithm.

25. The local digital TV signal generator of claim 18, wherein the RF signal generator is designed in a PC card type to be mounted inside a general PC.

26. The local digital TV signal generator of claim 18, wherein the RF signal generator is designed in a separate external set top box type to be mounted outside a general PC.

27. A local digital TV signal generator comprising:
 a memory device mounted in a PC for storing transport streams encoded by MPEG algorithm;
 a VSB signal processor for VSB modulating the data stored in the memory device to output an RF signal, including a VSB modulator for reading out the transport streams stored in the memory device if desired and VSB modulating them to output the RF signal; and
 a controller for synchronizing a clock between the memory device and the VSB modulator and converting the data output from the memory device to conform to data input format of the VSB modulator to be output to the VSB modulator.

28. The local digital TV signal generator of claim 27, wherein the memory device is a hard disk.

29. The local digital TV signal generator of claim 27, wherein the memory device is a DVD.

30. A local digital TV signal generator comprising:
 a demodulator for receiving a digital broadcasting signal from a broadcasting station, VSB demodulating the digital broadcasting signal, and outputting the demodulated signal to transport streams;

an audio/video signal processor for dividing an audio signal and a video signal from the transport streams output from the demodulator so that the audio signal is audio-decoded using AC-3 algorithm and the video signal is video-decoded using MPEG2 algorithm;

a memory device for storing the transport streams output from the demodulator;

a VSB modulator for VSB modulating the transport streams stored in the memory device to output an RF signal; and a controller for converting the transport streams output from the demodulator to a memory type to be stored in the memory device, reading out the transport streams stored in the memory device to conform to data input format of the VSB modulator to be output to the VSB modulator.

31. The local digital TV signal generator of claim 30, wherein the memory device is a hard disk mounted in a general PC.

32. The local digital TV signal generator of claim 30, wherein the memory device is a DVD mounted in the general PC.

33. The local digital TV signal generator of claim 32, wherein the DVD stores transport streams encoded by MPEG algorithm.

34. The local digital TV signal generator of claim 30, wherein the other blocks except the memory device are designed in at least one or more PC cards and can be mounted inside a PC.

35. The local digital TV signal generator of claim 30, wherein the other blocks except the memory device are designed in a separate set top box type and can be mounted outside a PC.

36. The local digital TV signal generator of claim 35, wherein a power supply is further provided if the other blocks except the memory device are designed in a separate set top box type.

* * * * *